(12) United States Patent
Speigle et al.

(10) Patent No.: US 7,356,180 B2
(45) Date of Patent: Apr. 8, 2008

(54) SYSTEMS AND METHODS FOR CORRECTING IMAGE COLOR BALANCE

(75) Inventors: Jon M. Speigle, Vancouver, WA (US); John E. Dolan, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 749 days.

(21) Appl. No.: 10/676,306

(22) Filed: Sep. 30, 2003

(65) Prior Publication Data

US 2005/0069201 A1 Mar. 31, 2005

(51) Int. Cl.
*G06K 9/00* (2006.01)
*G06K 9/40* (2006.01)
(52) U.S. Cl. ........................ 382/167; 382/274
(58) Field of Classification Search ................ 382/167
See application file for complete search history.

(56) References Cited

U.S. PATENT DOCUMENTS

| | | | |
|---|---|---|---|
| 4,648,051 A | | 3/1987 | Wandell et al. |
| 4,992,963 A | | 2/1991 | Funt et al. |
| 6,038,339 A | | 3/2000 | Hubel et al. |
| 6,229,916 B1 | * | 5/2001 | Ohkubo ................ 382/167 |
| 6,243,133 B1 | | 6/2001 | Spaulding et al. |
| 6,249,601 B1 | | 6/2001 | Kim et al. |
| 6,366,358 B1 | * | 4/2002 | Satou et al. ............ 358/1.14 |
| 6,594,384 B1 | * | 7/2003 | Kim et al. ............... 382/162 |
| 6,791,716 B1 | * | 9/2004 | Buhr et al. .............. 358/1.9 |
| 6,980,335 B2 | * | 12/2005 | Kubo ...................... 358/518 |

OTHER PUBLICATIONS

Buschsbaum, G. "A Spatial Processor Model for Object Color Perception," J. Franklin Inst., vol. 310, 1980.

Maloney, L.T.; Wandell, B.W. "Color Constancy: a method for recovering surface spectral reflectance", J. Optical Soc. Am. A, vol. 3, pp. 29-33, 1986.

Brainard, D.H.; W. T. "Bayesian color constancy," J. Optical Soc. Am. A, vol. 14, pp. 1393-1411, 1997.

Finlayson, G.D.; Hordley, S.D.; Hubel, P.M. "Color by correlation: a simple, unifying framework for color constancy," IEEE Trans. Pattern Analysis and Machine Intelligence, vol. 23, pp. 1209-1221, 2001.

Finlayson, G.D. Hordley, S.D.; Hubel, P.M. "Unifying color constancy," J. Imaging Science and Technology, vol. 45, pp. 107-116, 2001.

Luo, Jiebo; Etz, Stephen "A Physical Model-Based Approach to Detecting Sky in Photographic Images," IEEE Transaction on Image Processing, vol. 11, No. 3, pp. 201-212, Mar. 2002.

Maloney, L. T., "Physics-Based Approaches to Modeling Surface Color Perception".

Finlayson, G.D., Color In Perspective, IEEE PAMI, 1996, pp. 1034-1038.

Forsyth, D.A., A Novel Approach to Color Constancy, ICCV88, pp. 9-18.

Swain, M.J. and Ballard, D.H., Color Indexing, IJCV(7), No. 1, Nov. 1991, pp. 11-32.

Rubner, Y., Tomasi, C. and Guibas, L., The Earth Movers Distance as a Metric for Image Retrieval, Technical Reprot STAN-CS-TN-98-86, Stanford Computer Science Department, Sep. 1998.

* cited by examiner

*Primary Examiner*—Wenpeng Chen
*Assistant Examiner*—Yuzhen Ge
(74) *Attorney, Agent, or Firm*—Krieger Intellectual Property, Inc.; Scott C. Krieger

(57) ABSTRACT

Embodiments of the present invention comprise systems and methods for modification of image color-balance corrections.

23 Claims, 10 Drawing Sheets

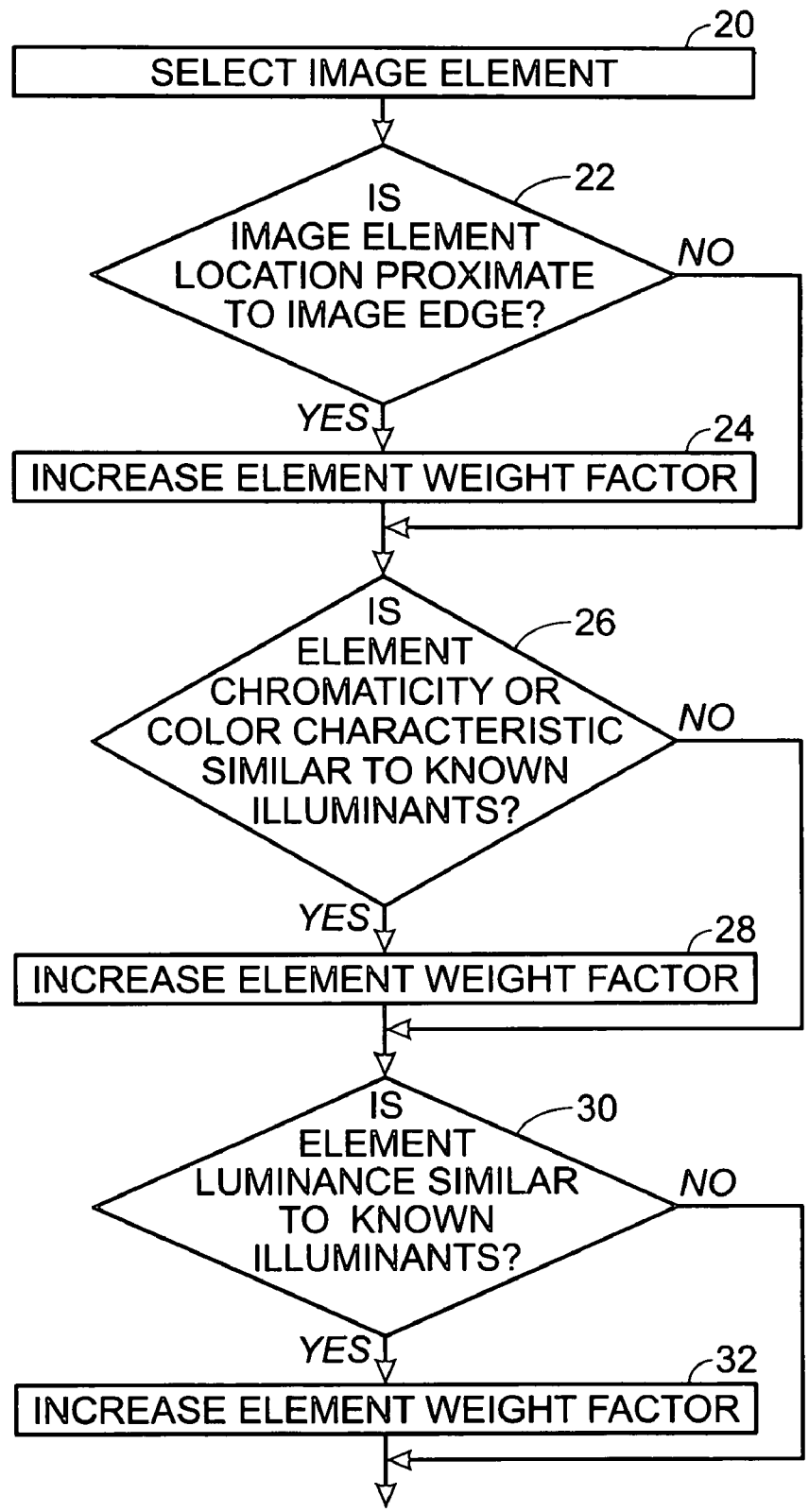

Fig. 3b  p(sky | xy)
Fig. 3d  p(sky | xy,Y,pos)
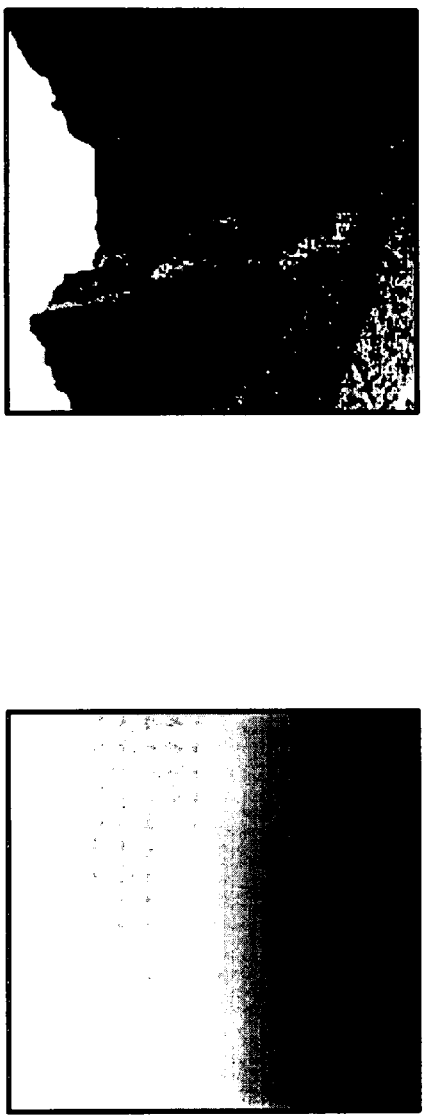
Fig. 3a  p(sky | pos)
Fig. 3c  p(sky | Y)

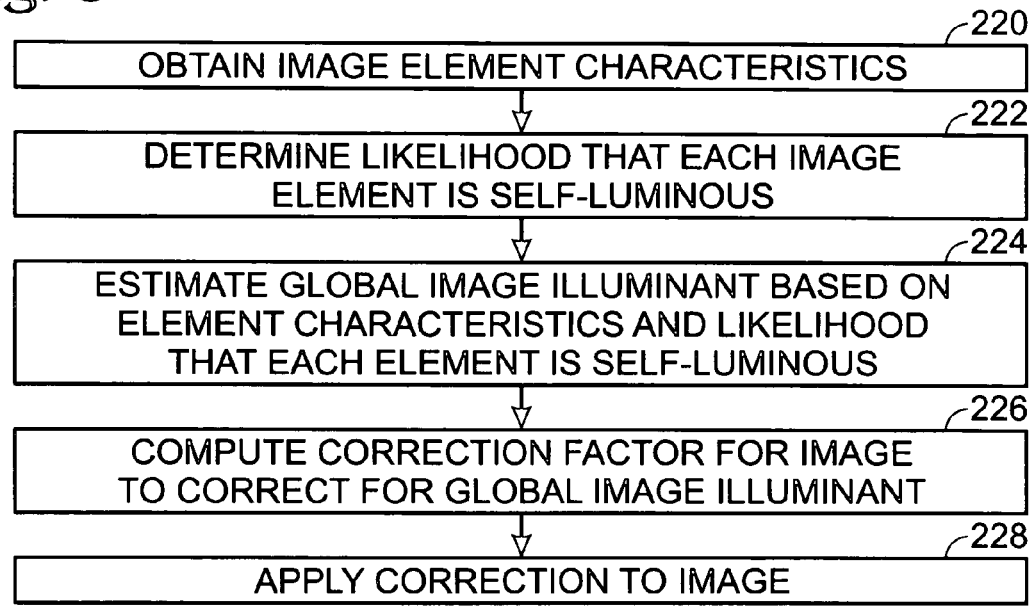
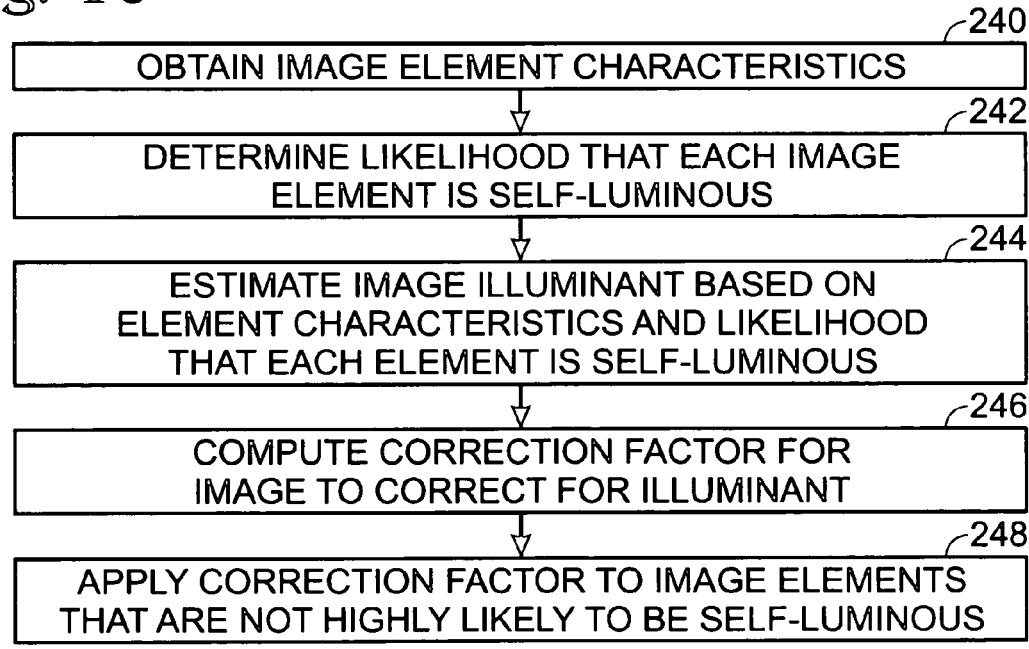

SYSTEMS AND METHODS FOR CORRECTING IMAGE COLOR BALANCE

TECHNICAL FIELD

The present invention relates generally to digital image processing and more particularly to methods and systems for selectively applying image illuminant corrections.

BACKGROUND

Colors viewed in an image are dependent on the light that illuminates the subject of the image. Different illuminants will cause differences in the light reflected from the surfaces of the image subject matter and therefore differences in visual response to the reflected light. The human visual system approximately corrects these response differences to a perceived norm. However, when images are captured on media and viewed under a light source different than the source in the image scene, these natural corrections do not take place. Accordingly, recorded images need to be color-balanced to a "normal" light source in order to appear as they would to the natural eye. This balancing or color correction can be performed once the scene illuminant is identified.

There are many known methods for identification of a light source or illuminant in an image scene. However, the conventional correction algorithms assume that all image pixels represent reflecting surfaces. When an image contains self-luminous objects such as sky and other light sources the surface-pixel assumption is violated. When an image contains a significant portion of non-reflective, self-luminous objects, conventional methods will fail and the image illuminant will be incorrectly determined. For example, if an image contains blue sky and the color-balance algorithm assumes that all pixels are reflecting objects, "bluish" pixels could be taken as evidence that the illumination of the scene is bluish. Because a color correction is approximately the opposite hue of the estimated illuminant, the correction for a bluish illuminant would be to shift the image in a yellowish direction. This correction might produce an overly yellowish ground/surface region and a desaturated sky region.

These color correction, color balance or color constancy algorithms generally do not address the question of how to handle images containing luminous objects, which are also referred to herein as self-luminous objects. They have, rather, focused on images where the surface-pixel assumption is satisfied (e.g., uniformly illuminated Mondrian-like images).

It would be advantageous if a method existed that permitted accurate digital image illuminant corrections to be made for images containing significant exception regions, such as self-luminous regions.

SUMMARY

The present invention describes a method for addressing problems in application of color balance corrections to images containing exception characteristics, such as self-luminous or non-reflecting objects, color distribution properties and other parameters.

Accordingly, a method of compensating digital image corrections is provided. The method comprises the acts of: calculating digital image correction parameters; determining image exception characteristics; and applying the corrections to the digital image in response to the image exception characteristics. The image exception characteristics can be factors such as detecting image self-luminous regions, color distribution properties, multiple illuminants and other parameters.

Applying the corrections to the digital image in response to the image exception characteristics may comprise processes such as varying the attenuation of a correction, global omission of a correction, using a plurality of corrections, selective application of one or more corrections to spatial regions, selective application of one or more corrections to chromatic ranges, selective application of one or more corrections to luminance ranges, selective application of one or more corrections to self-luminous and/or reflective regions.

For example, calculating digital image correction parameters may include calculating a correction for a set of pixels, and determining image exception characteristics may include detecting image self-luminous regions. Then, applying the corrections to the digital image in response to the image exception characteristics includes varying the attenuation of the correction for the set of pixels in response to pixel position or region. That is, a full, or near-full correction is applied to pixel positions in non-luminous regions and a full, or near-full attenuation is applied to corrections in luminous regions.

In some embodiments of the present invention, detecting image self-luminous regions includes detecting self-luminous regions in response to a combination of confidence measures such as pixel color characteristics, luminance characteristics and position or location characteristics. Other confidence measures may include combinations of the above-mentioned factors.

For example, in some embodiments, a luminous region may be detected in response to bright pixel luminance, where bright pixel luminance is defined as either relatively bright with respect to surrounding image regions or brighter than a threshold brightness.

In some embodiments, luminous regions may be detected in response to a function of projections of color values such as pixel chromaticity or the chromatic dimensions of a uniform colorspace such as CIE Lab. For example, a function based on a hue angle and/or distance from a reference point in a chromaticity chart may be used. In more specific embodiments, a CE standard illuminant, such as Daylight 6500 (D65) can be used as a reference and a specific angle or angular range can be used to identify self-luminous regions or other regions of interest. In other embodiments color distance measures may also be used to identify or partially identify luminous characteristics.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

FIG. 1b is a flowchart illustrating methods of self-luminous element detection and element weighting of some embodiments of the present invention;

FIG. 3*a* is an image illustrating a likelihood of being self-luminous based on pixel position relative to an image boundary;

FIG. 3*b* is an image illustrating a likelihood of being self-luminous based on color characteristics;

FIG. 3*c* is an image illustrating a likelihood of being self-luminous based on luminance characteristics;

FIG. 3*d* is an image illustrating a combined likelihood of being self-luminous based on the combination of factors illustrated in FIGS. 3*a*, 3*b* and 3*c*;

FIG. 9 is a flowchart illustrating methods of embodiments employing a correction factor;

FIG. 10 is a flowchart illustrating methods of embodiments wherein self-luminous elements are distinguished during correction;

DETAILED DESCRIPTION

Figure 1A:
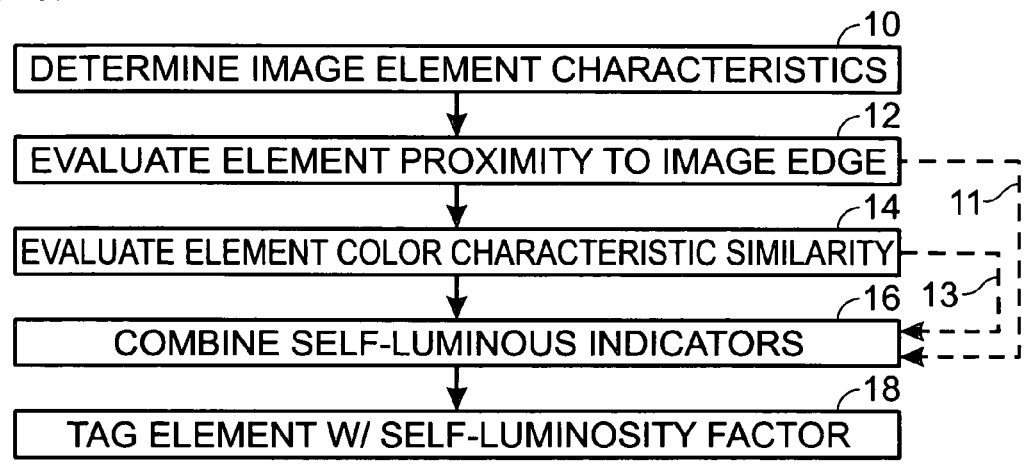
FIG. 1a is a flowchart illustrating methods of self-luminous element detection of some embodiments of the present invention.

In some embodiments of the present invention, methods for determining image self-luminous regions are employed. Digital image correction parameters may be calculated in response to determining the self-luminous regions. Image self-luminous regions can be determined from image feature measures. For example, image feature measures can be pixel color characteristics, pixel luminance and/or pixel position parameters.

In many algorithms of embodiments of the present invention, a color-balance correction takes the form of a matrix that is applied in a linear colorspace such as the tristimulus values of CIE 1931 XYZ. Input tristimulus values can be multiplied by a matrix to produce a set of color-corrected values as follows:

$$x' = M \cdot x$$

where
x is a vector of tristimulus values
M is a color correction matrix
x' is the vector of corrected values.

A color adaptation model is often referenced in a color-correction context. In this model adaptation occurs independently within long-, medium-, and short-wavelength sensitive channels:

$$L' = g_L \cdot L$$

$$M' = g_M \cdot M$$

$$S' = g_S \cdot S$$

where L, M and S refer to the long-, middle-, and short-wavelength photoreceptor responses. In a cone colorspace the corrections could be implemented as a diagonal matrix. This same correction can be transformed by a change of basis to operate on CIE tristimulus values, in which case it would still be 3-by-3 but would contain off-diagonal terms. Others have applied similar diagonal models for color correction in an RGB or the XYZ colorspace.

A different method of defining a correction matrix is in terms of an estimated illuminant for the scene. These methods use linear models for reflectances and illuminants. After principle components analysis (or singular value decomposition, SVD) on a large set of reflectance or illuminant functions (e.g., those of the matte Munsell chipset or measured daylight power spectra), typical illuminants and surfaces can be described within low-dimensional linear models. Reflectance functions and illuminant spectral power distributions can then be approximated within the linear model by sets of weights:

$$r = B_s w_s$$

$$e = B_e w_e$$

where
r is a 1-by-nWavelengths vector of reflectance values;
e is a 1-by-nWavelengths vector of illuminant spectral power values;
$w_s$ is a set of weights within the surface linear model;
$w_e$ is a set of weights within the illuminant linear model;
$B_s$ is a set of surface basis functions; and,
$B_e$ is a set of illuminant basis functions.

Sensor responses to a surface rendered under an illuminant can be computed as $$x = T E B_s w_s,$$

where
E is a diagonal [nwavelengths, nwavelengths] matrix representing the illuminant, i.e., E=diag ($B_e w_e$);
T is a matrix representing sensor spectral sensitivities, [nSensors-by-nwavelengths]

The mapping from reflectance weights to sensor responses may be inverted using linear regression or some other error minimization technique:

$$w_s = (T E B_s)^{-1} x$$

and the reflectance weights may then be used to render the reflectance functions under a second reference illuminant. The equation relating original to corrected sensor responses is:

$$x' = M \cdot x$$

where $M = TE_2B_s(TE_1B_s)-1$;
$E_2 = \text{diag}(e_{canonical})$;
$E_1 = \text{diag}(B_E w_E)$;
$e_{canonical}$ is the spectral power distribution of a canonical illuminant;
$w_E$ is an illuminant estimate for hte original scene.

In embodiments of the present invention, image elements, such as pixels or groups thereof, are evaluated to determine whether they are likely to violate assumptions of the colorbalance estimation method or assumptions of the colorbalance correction method. In the methods disclosed herein, colorbalance estimation and correction methods are made responsive to violations of the colorbalance algorithm assumptions.

In some embodiments of the present invention, image elements, such as pixels or groups thereof, are evaluated to determine whether they are likely to represent self-luminous objects in the image. Such objects violate the assumption implicit in most colorbalance estimation and correction algorithms that image regions represent reflecting surfaces. Elements may be more likely to be self-luminous when they are located in proximity to the edges of the image. For example, and not by way of limitation, in images that contain regions of sky, a self-luminous area, the self-luminous sky area is typically located along the top edge of the image. When images are rotated, such as from landscape to portrait format, tip edges may become side edges and vice versa. Accordingly, in some embodiments of the present invention, proximity to any edge can be an indicator of self-luminance. In other embodiments, image orientation algorithms may be used to identify the top, bottom and sides of an image. In other embodiments, an image may comprise metadata or some other indication of image orientation. In these embodiments with identified orientation, proximity to particular edges may be indicative of self-luminance. For example and not by way of limitation, a pixel's proximity to the top of the image may be more indicative of self-luminance than proximity to the side or bottom of the image.

In some embodiments, an element's likelihood of being self-luminous may be determined in relation to the element color characteristics or descriptors. In some embodiments, the output of this function can be viewed as a continuous-tone grayscale image, where lighter regions correspond to regions likely to be self-luminous objects and darker regions correspond to reflecting surfaces.

In some embodiments, an element's chromaticity or non-intensive color characteristics can be used to determine self-luminance. When an element's chromaticity is similar to the chromaticity of known illuminants or self-luminous objects, then that element is more likely to be self-luminous.

In some embodiments, an element's intensive characteristics can be used to determine self-luminance. When an element's intensive characteristic is similar to the intensive characteristic of known illuminants or self-luminous objects, then that element is more likely to be self-luminous.

In some embodiments, an element's intensive and non-intensive characteristics can jointly be used to determine self-luminance.

Some embodiments of the present invention comprise the steps illustrated in the chart of FIG. 1a wherein an image element, such as a pixel or region of interest, is evaluated 10 to determine its characteristics such as location, non-intensive color characteristics such as chromaticity and/or intensive values such as luminance. The location of the element is evaluated 12 to determine its proximity to image edges and, if the element is sufficiently proximate to an edge, a specific edge or some other geometric image boundary the element is considered more likely to be self-luminous.

The color characteristics of the element are then evaluated 14 and the element is considered more likely to be self-luminous if the color characteristics match color characteristics of known illuminants or self-luminous objects.

The results of these evaluations can be combined 16 and, if sufficient evidence exists, the element can be considered likely to be self-luminous 18.

In other embodiments of the present invention, as illustrated in FIG. 1b, an image element can be evaluated and classified according to a weighting factor or score. In these embodiments, an element is examined to determine whether its location is proximate to image edges, specific edges or some other image boundary characteristic. If the location is sufficiently proximate to one of more of these characteristics, the weight factor or score of that element is increased 24 and the element is further evaluated.

If an element's color characteristics are similar to those of known self-luminous objects 26, such as blue sky, overcast sky, tungsten-incandescent light, fluorescent light and others, that element can be considered likely to be self-luminous and the element's weighting factor or score can be increased 28 to reflect this likelihood.

If an element's luminance characterisitics are found to be similar to those of known self-luminous objects 30, the weighting factor or score of that element can be increased 32 to reflect a higher likelihood that the element is self-luminous. When the score or weighting factor of an element is sufficiently high, the element may be considered self-luminous.

Figure 2:
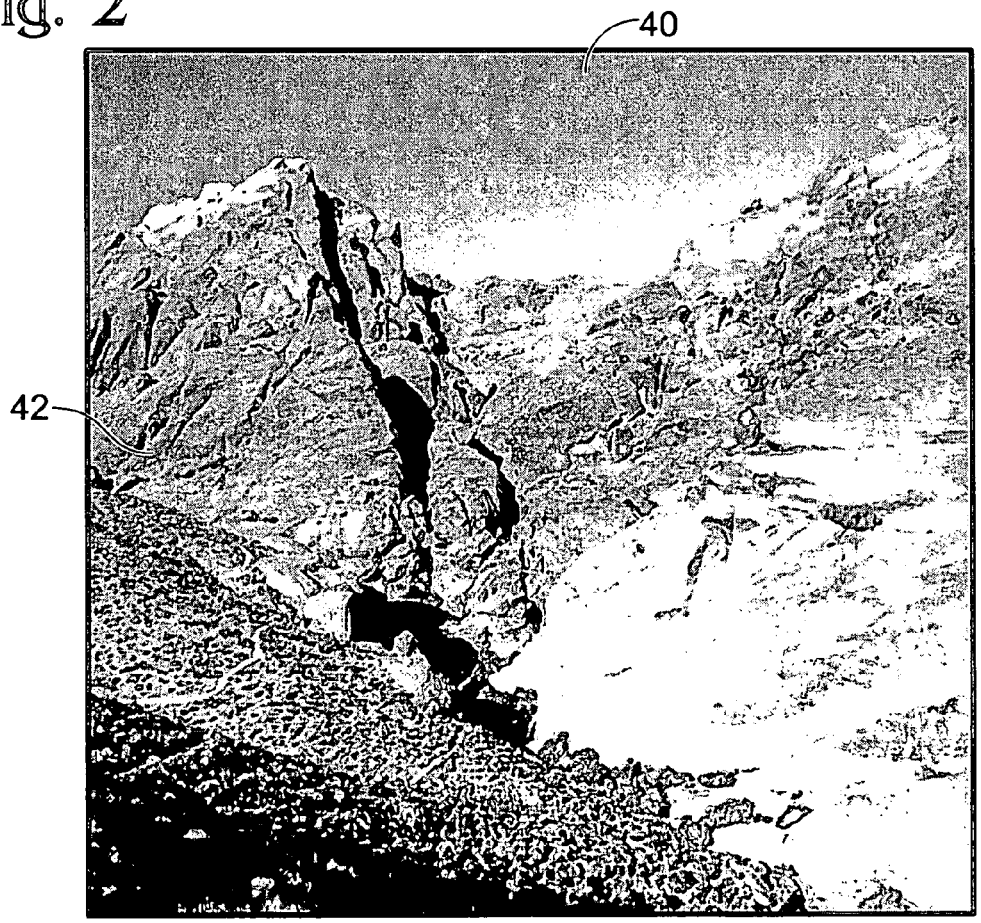
FIG. 2 is a an exemplary image used to illustrate elements of embodiments of the present invention.

The methods of some embodiments of the present invention may be illustrated with reference to FIG. 2, which is an original digital image and FIGS. 3a-3d, which are a set of images derived from FIG. 2 depicting the likelihood of self-luminosity based on element location, chromaticity or color characteritics, and/or luminance parameters. In the images in FIGS. 3a-3d, white areas represent areas of high likelihood, while black areas represent low likelihood.

In some embodiments of the present invention, a self-luminosity decision variable, s, can be computed as:

$$s = f(x,i,j)$$

where x represents a neighborhood of color values; and
i,j represent the position of the neighborhood In some embodiments, independence between the factors can also be assumed. This is convenient computationally at the expense of not taking advantage of correlations between terms (e.g., that sky is likely to be both bluish and of high luminance).

$$s = g(x) * h(i,j)$$

In some embodiments, the term dependent on color values can be decomposed into separable terms based on chromaticity, c, and luminance, Y:

$$s = g_1(c) * g_2(Y) * h(i,j)$$

In some embodiments, $g_1(c)$ can be designed such that a maximum is reached at the hue angle of "blue sky" and that decreases as the hue angle deviates from this value. Similarly, $g_2(Y)$ can be based on the luminance distribution for a large number of sky regions. For h(i,j), the simple assumption can be made that sky is more likely near the edges of the image. Here h(i,j) is a linear function of pixel row number.

Note that these choices for $g_1(c)$ and $g_2(Y)$ strongly bias the model toward identifying regions of "blue sky" as the self-luminous objects.

FIG. 2 is an image containing surface regions 42 and sky regions 40. FIG. 3 illustrates maps of self-luminous likelihood functions. We use "xy" to denote chromaticity and "Y" to denote luminance, after the CIE 1931 xyY colorspace. In the ground regions, the final probability is near zero as illustrated by the black color in all four images in FIGS. 3a-3d.

In FIG. 3a, the likelihood of an element being self-luminous near the top edge of the image is shown by the lighter shading that gets progressively darker as the location becomes more distant from the top edge.

In FIG. 3b, the elements or pixels that have chrominance similar to "blue sky" are shown in white, while those "distant" from that range of hues are shown in darker shades.

In FIG. 3c, the elements or pixels that have luminance values similar to those of known self-luminous objects are shown in lighter shades. In this exemplary image case, few pixels have high luminance as the sky in this image is relatively dark.

FIG. 3d shows a composite image representing a combination of self-luminosity feature images shown in FIGS. 3a-3c. In this figure, only elements in the sky are shown in lighter shades thereby signifying a successful application of the combined analysis.

Figure 4:
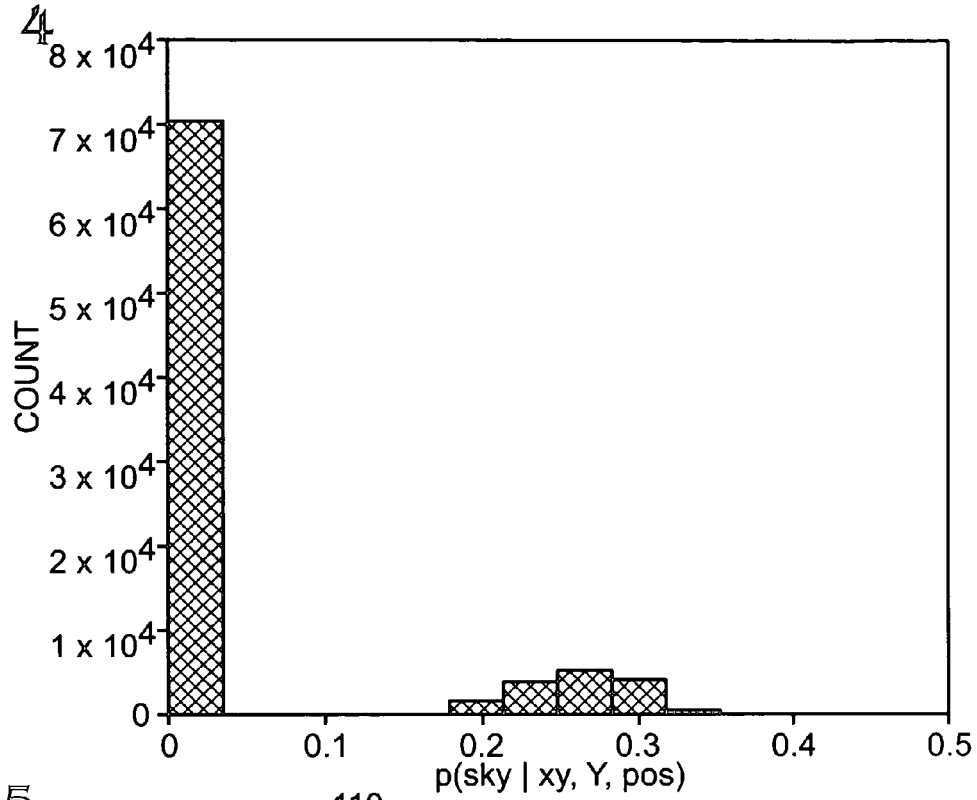
FIG. 4 is a diagram illustrating an exemplary self-luminous probability distribution

FIG. 4 is a diagram illustrating the probability distribution corresponding to FIG. 3d. The "sky" region corresponds to the values in the 0.2-0.35 range.

Figure 5:
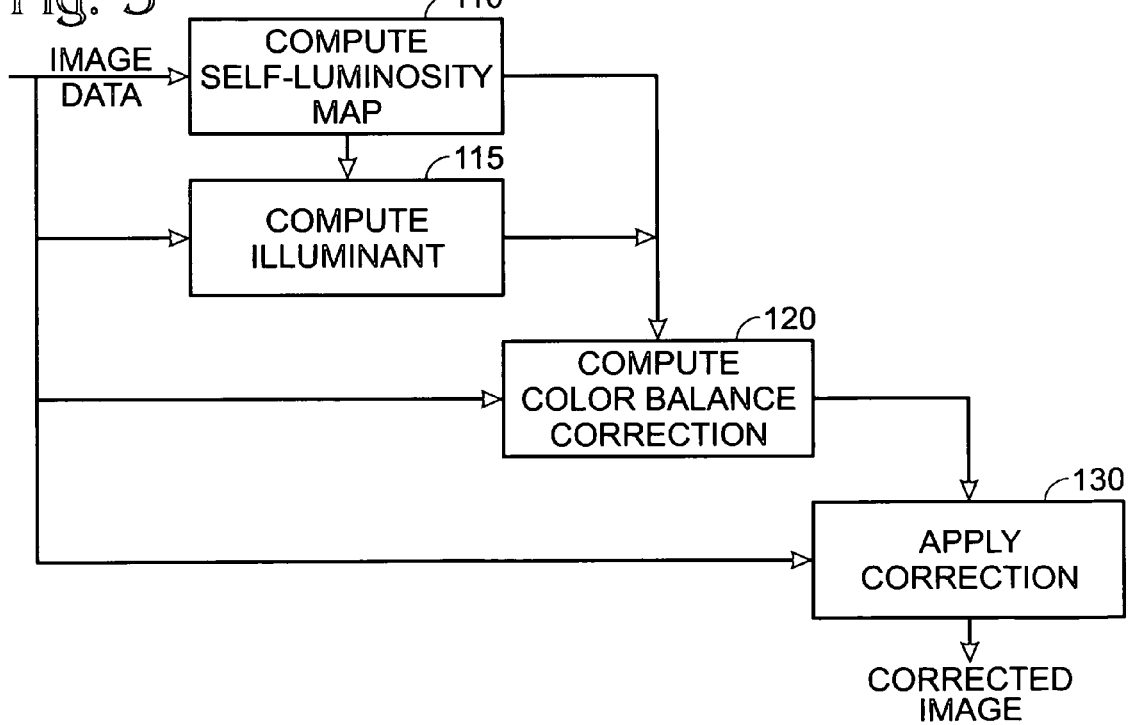
FIG. 5 is a flowchart illustrating some steps of embodiments of the present invention.

Embodiments of the present invention may be used in conjunction with color balance or color constancy methods and correction of color balance in digital images. In some embodiments of the present invention, as shown in FIG. 5, inventive methods and systems may be used to determine self-luminous elements 110. These methods and systems may further influence the determination of an image illuminant 115 and the correction used to achieve color balance 120. These systems and methods may also have an effect on the application of the color balance correction 130.

Most color-balance algorithms can be modified to use a self-luminous classification map to derive color-balance parameter estimates from only those pixels classified as non-self-luminous. These modified algorithms would produce estimates with reduced bias due to the presence of self-luminous image regions.

For example, the greyworld algorithm could be modified to compute a weighted average of the scene chromaticities where the weight would be reduced for pixels likely to be self-luminous.

Consider the illuminant estimation method that selects the illuminant parameters $e_i$ such that the function $f(e_i)$ is maximized for the image, I:

$$f(e_i) = \Sigma p(x_k | I, S_k=0) * p(x_k | e_i)$$

where $x_k$ represents a vector of color values $S_k$ represents a binary variable indicating the state of self-luminous (S=1) or surface (S=0)

$e_i$ represents a set of parameters for the ith illuminant $p(x_k | I, S_k=0)$ represents the likelihood of observing color coordinates $x_k$ in image I for the non-self-luminous pixels.

$p(x_k | e_i)$ represents the likelihood of observing color coordinates $x_k$ under illuminant $e_i$.

This term represents a scene/image color probability model that is indexed by illuminant.

When the color frequencies observed in the image match the color frequencies expected under a particular illuminant, the value f will be large. The illuminant corresponding to the maximum of $f(e_i)$ is the illuminant most consistent with the surface pixels in the image.

For a discrete set of color coordinates, the observed color likelihood function can be approximated as:

$$p(x_k | I, S=0) = n_k / N_{S=0}$$

where $n_k$ represents the number of surface pixels within a distance $\epsilon$ of coordinate $x_k$ $N_{S=0}$ is the number of pixels in the surface class An alternative method of estimating an illuminant from an image, I, is to directly use the self-luminous decision variable rather than a classification map. Consider the illuminant estimation method that selects the illuminant parameters $e_i$ such that the function $g(e_i)$ is maximized:

$$g(e_i) = \Sigma w_k * p(x_k | e_i)$$

where $w_k$ represents a weight for a kth vector of color values that is dependent on the corresponding self-luminous decision variable The value $w_k$ may be computed from pixel self-luminous decision variable, s:

$$w_k = 1 - s$$

where s is normalized to have range 0-1.

$p(x_k | e_i)$ represents the likelihood of observing color coordinates $x_k$ under illuminant $e_i$. The term $w_k$ weights the contributions of pixels that are non-self-luminous more than pixels that are self-luminous. Thus the value $g(e_i)$ will be a measure of how consistent illuminant $e_i$ is with the surface pixels in the image.

For a discrete set of color coordinates, the weight may be computed as:

$$w_k = \Sigma w_j$$

where j indexes over the pixels within a distance $\epsilon$ of coordinate $x_k$ In alternative embodiments, a Bayesian color balance estimation technique can be used to select the illuminant, $e_i$, that maximizes the illuminant posterior probability distribution, $p(e_i | I)$, of the illuminant parameters conditioned on the image data. Bayes' Law relates the posterior to the prior, $p(e_i)$, and image likelihood function, $p(I | e_i)$:

$$p(e_i | I) = k \cdot p(I | e_i) \cdot p(e_i)$$

where k is a normalizing constant $p(e_i)$ represents the likelihood of different illuminants $p(I | e_i)$ represents the likelihood the image given that the scene was illuminated by illuminant $e_i$.

If pixels are assumed independent from one another, then the color likelihood of the image is the product of the likelihoods of each pixel's color values, $x_j$, given the illuminant:

$$p(I | e_i) = \Pi p(x_j | e_i)$$

One method of introducing a self-luminous classification map into the pixel likelihood function is to let a binary variable S indicate that a pixel is self-luminous (S=1) or non-self-luminous (S=0). The color likelihood function is equal to, $$p(x_j|e_i)=p(x_j|e_i, S=0)p(S=0)+p(x_j|e_i, S=1)p(S=1)$$

For the case where a pixel is self-luminous, the color likelihood function can be treated as conditionally independent of the illuminant:

$$p(x_j|e_i, S=1)=p(x_j|S=1)$$

where $p(x_j|S=1)$ is a probabilistic model for self-luminous regions

Substituting, the image likelihood is computable as:

$$p(I|e_i)=\Pi\{p(x_j|e_i, S=0)p(S=0)+p(x_j|S=1)p(S=1)\}$$

From the image likelihood function, the illuminant posterior distribution may be computed and then maximized to yield an illuminant estimate.

In some embodiments, the posterior, $p(e_i|I)$, may be computed by multiplying the image likelihood and illuminant prior. The prior, $p(e_i)$, may be used to account for the relative likelihood of different illuminants; for instance, illuminants may be expected to be near the daylight locus.

In some embodiments, a cost function may be used and computed by multiplying the posterior by a function which modifies the result toward a reference illuminant (such as CIE D6500). A bias toward a reference illuminant can be useful because corrections associated with extreme estimated illuminants can produce undesirable resultant images if the illuminant estimate is in error.

The illuminant estimate may be the illuminant associated with the maximum after applying the cost function.

The color likelihood function given the illuminant parameters, $p(x_j|e_i)$, is computed by making assumptions or measurements of the distributions of colors in scenes. The purpose of this term is to characterize the likelihood of different colors under each illuminant. For example, under a reddish illuminant chromaticities with a nominally reddish hue would be more likely and nominally bluish chromaticities would be highly unlikely.

Figure 6:
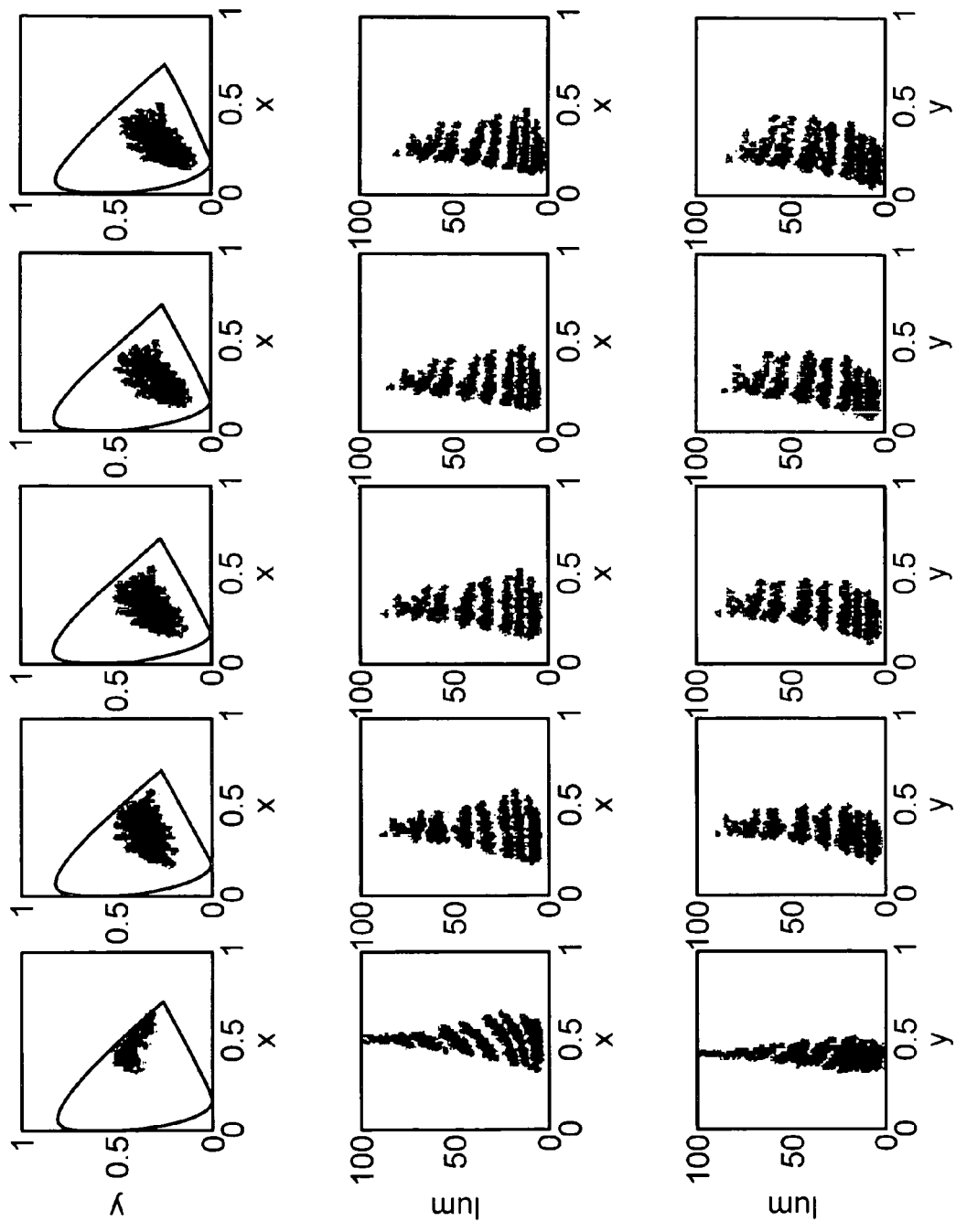
FIG. 6 is a diagram illustrating the various color distributions reflected from selected illuminants.

FIG. 6 illustrates how a set of matte Munsell surfaces shifts under a set of illuminants that are near the daylight locus. Each column of plots corresponds to a different illuminant. There is a clear shift in the chromaticities of the Munsell set with each illuminant.

Figure 7:
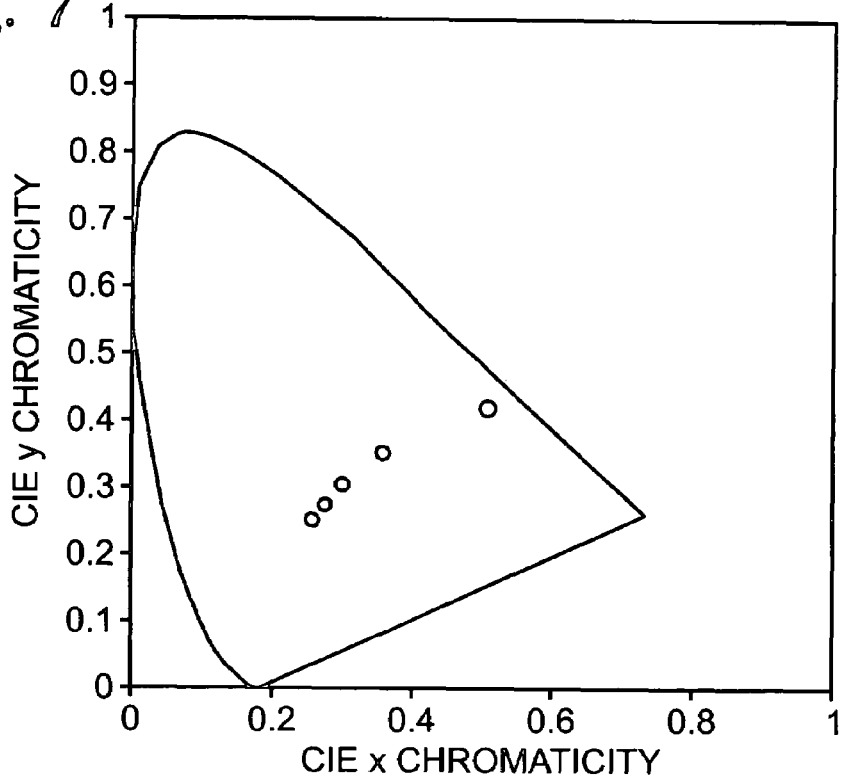
FIG. 7 is a diagram illustrating the chromaticities of the illuminants shown in FIG. 6.

FIG. 7 illustrates the chromaticities of the illuminants depicted in FIG. 6. The color of these illuminants varies in a bluish-yellowish direction.

One method of computing $p(x_j|e_i)$ is to assume that colors in images are uniformly drawn (with replacement) from the set of Munsell matte patches. The long-term average color frequencies will be the same as rendering the Munsell set under the illuminant. The probability of a given chromaticity, [x,y], under the ith illuminant will simply be the frequency at that chromaticity of the distribution of the Munsell set under that illuminant. An alternative method is to derive an emprical color model from the surface color distributions across a large collection of images or objects.

In some embodiments of the present invention, a likelihood of occurrence of specific colors may be pre-computed for a set of illuminants. These may be referred to as model gamuts, $p(x|e_i)$. The model gamuts represent the probability of occurrence of each color given the illuminant.

In some embodiments, the probability of being self-luminous may be computed for each pixel as a function of color and position, $p(S=1|x, i, j)$. The inverse value, $p(S=0|x, i, j)$, may be accumulated as a function of color value to form a reduced image self-luminosity feature vector, $q(x_k)$ specified at a set of color coordinates.

Illuminant parameters $e_i$ may then be selected such that the function $F(e_i)$ is maximized for the image, I:

$$F(e_i)=\Sigma q(x_k)*p(x_k|e_i)$$

In some embodiments, the image likelihood, $p(I|e_i)$, may be approximated as the inner product between $q(x_k)$ and $p(x_k|e_i)$. From this approximation, an approximation to the illuminant posterior distribution can be computed which combines the approximated image likelihood with the illuminant prior. This approximated posterior distribution may then be modified by an illuminant cost function and subsequently maximized to select an estimated illuminant.

Figure 8:
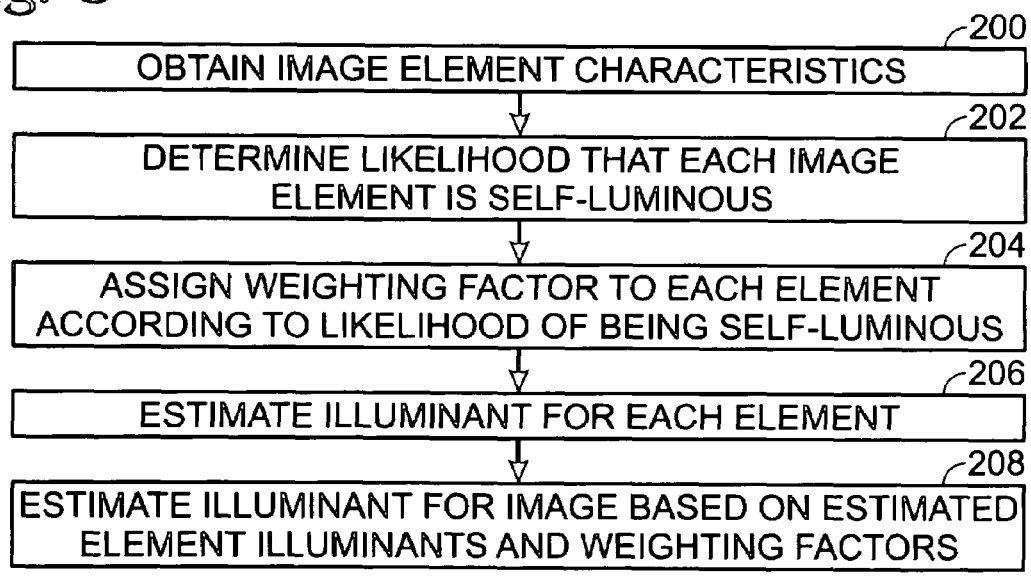
FIG. 8 is a flowchart illustrating methods of embodiments employing a weighting factor related to a likelihood of being self-luminous.

Some embodiments of the present invention may be explained with reference to FIG. 8, which is a flowchart illustrating the steps of an image illuminant process. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. Initially, image element characteristics are obtained 200. These characteristics typically comprise image element color characteristics, luminance characteristics and location data as well as other characteristics. Using the element characteristic data, the likelihood that each image element is self-luminous can be determined. This may be performed as explained in other embodiments above with reference to image element proximity to image edges or boundaries, to element chromaticity relative to chromaticity of known illuminants and to element luminance.

A weighting factor may be assigned 204 to each element based on its likelihood of being self-luminous. The most likely illuminant is then estimated for each element based on element characteristics 206. The image illuminant is then estimated 208 using image element characteristics and the weighting factors. The image illuminant may be estimated 208 in many ways according to the methods of embodiments of the present invention. In some embodiments, the weighting factor may be used to adjust the contribution of elements to the image illuminant estimation process. This adjustment may comprise complete omission of likely self-luminous elements or diminution of their contribution to the estimation process.

Other embodiments of the present invention may be explained with reference to FIG. 9, which is a flow chart showing an image color-balance correction process. In these embodiments, image element characteristics are obtained 220 in a typical manner as is known in the art. A likelihood that each image element is self-luminous is then determined 222 according to methods explained herein. A global image illuminant is estimated 224 for the entire image based on image element characteristics and the likelihood that each element is self-luminous. A correction factor is then computed 226 to color-balance the image for the illuminant that has been estimated. This correction factor is then applied to the image 228 to achieve proper color-balance.

Other embodiments of the present invention may be explained with reference to FIG. 10, which is a flow chart illustrating a method for selective application of a color-balance correction factor. In these embodiments, image element characteristics are obtained 240 by methods known in the art. A likelihood that each element is self-luminous is determined 242 as explained above and an image illuminant is estimated 244 based on the element characteristics and the likelihood that each element is self-luminous. One of more correction factors are computed 246 to correct the image for the illuminant and the correction factor or factors are applied to the image 248 according to each element's likelihood of being self-luminous. In these embodiments, the correction factor may be applied only to elements that are not likely to be self-luminous, may be applied in degrees according to magnitude of the likelihood of being self-luminous or may be applied in other ways that are proportional or otherwise related to the likelihood of an element being self-luminous.

Further embodiments may comprise estimating a modified common illuminant. In these embodiments a map of reflective regions and self-luminous regions is created. A composite illuminant is calculated primarily in response to the reflective regions and secondarily in response to de-emphasized self-luminous regions. A correction for this composite illuminant is then computed that shifts the color values of the pixels in the reflective and self-luminous regions in response to the difference between the composite illuminant and the selected reference illuminant.

In some embodiments, determining an illuminant of a reflective region comprises sorting color values into a set of groups and counting the number of members of each color value group. The illuminant most likely to generate the set of color value groups is then selected.

In alternative embodiments, determining an illuminant of a reflective region includes sorting color values into a set of groups distinguished by pixel chromaticity and counting the number of members of each chromaticity group. The illuminant most likely to generate the set of chromaticity groups is then selected.

Figure 11:
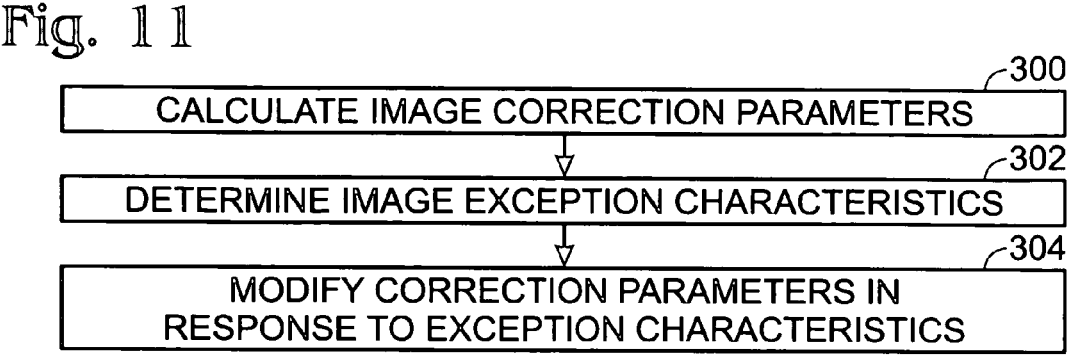
FIG. 11 is a flowchart illustrating embodiments wherein image exception characteristics are used to modify correction parameters.

Some embodiments of the present invention may be explained in reference to FIG. 11, which is a flowchart illustrating methods of modifying digital image corrections. Although the methods are depicted as a sequence of numbered steps for clarity, no order should be inferred from the numbering unless explicitly stated. It should be understood that some of these steps may be skipped, performed in parallel, or performed without the requirement of maintaining a strict order or sequence.

In these embodiments, digital image correction parameters are calculated 300. These correction parameters may be related to color balance, illuminant detection, or other image enhancement, image processing or similar processes. Image exception characteristics are also determined 302. These exception characteristics may be related to image illuminants, image color characteristics, image luminance characteristics, image chrominance ranges such as small chrominance gamut or unlikely chrominance gamut and other image characteristics. When these exception characteristics are determined, the image correction parameters may be modified 304 in response to these exception characteristics.

In some embodiments, modification in response to the exception characteristics may comprise differential application of the correction parameters to segments of the digital image, varying the attenuation of a correction, using a plurality of corrections and other modifications and processes.

Figure 12:
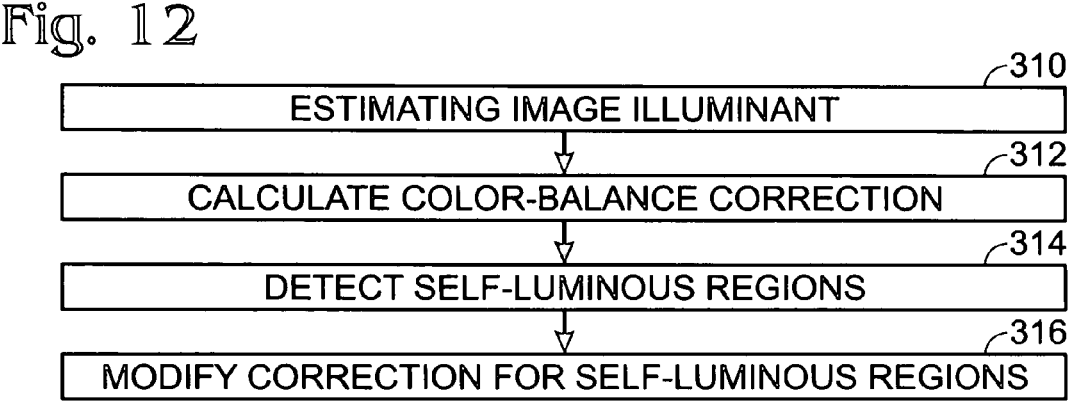
FIG. 12 is a flowchart illustrating embodiments wherein image exception characteristics comprising self-luminous characteristics are used to modify correction parameters.

In some embodiments of the present invention, illustrated in FIG. 12, calculating digital image correction parameters 300 comprises estimating an image illuminant 310 and calculating a color-balance correction 312. Determining image exception characteristics 302 may also comprise detecting self-luminous regions 314 and modifying corrections in response to exception characteristics 304 comprises modifying the color-balance correction for application in the self-luminous regions 316. In some of these embodiments, modifying the color-balance correction 316 may comprise attenuation of the color-balance correction in self-luminous regions, omission of the correction in self-luminous regions, application of a different correction in self-luminous regions and other correction modification techniques.

Figure 13:
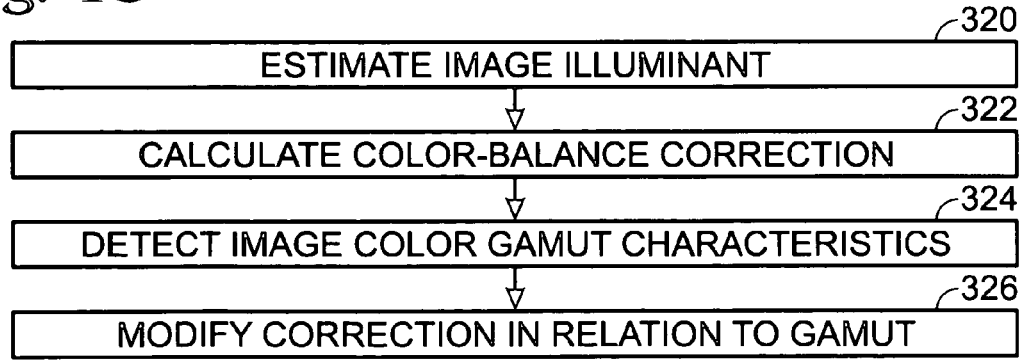
FIG. 13 is a flowchart illustrating embodiments wherein image exception characteristics comprising image color gamut distribution characteristics are used to modify correction parameters.

In some embodiments of the present invention, illustrated in FIG. 13, calculating digital image correction parameters 300 comprises estimating an image illuminant 320 and calculating a color-balance correction 322. Determining image exception characteristics 302 may also comprise detecting image color gamut characteristics 324 such as a color gamut range or a color gamut likelihood of occurrence. In these embodiments, modifying corrections in response to exception characteristics 304 may comprise modifying the color-balance correction in relation to the color gamut characteristics 326. In some of these embodiments, modifying the color-balance correction 326 may comprise attenuation of the color-balance correction when a color gamut is unusually restricted or unlikely to occur in a specific type of image, omission of the correction when a color gamut is unusually restricted or unlikely to occur in a specific type of image, application of a different correction when a color gamut is unusually restricted or unlikely to occur in a specific type of image and/or other correction modification techniques.

Figure 14:
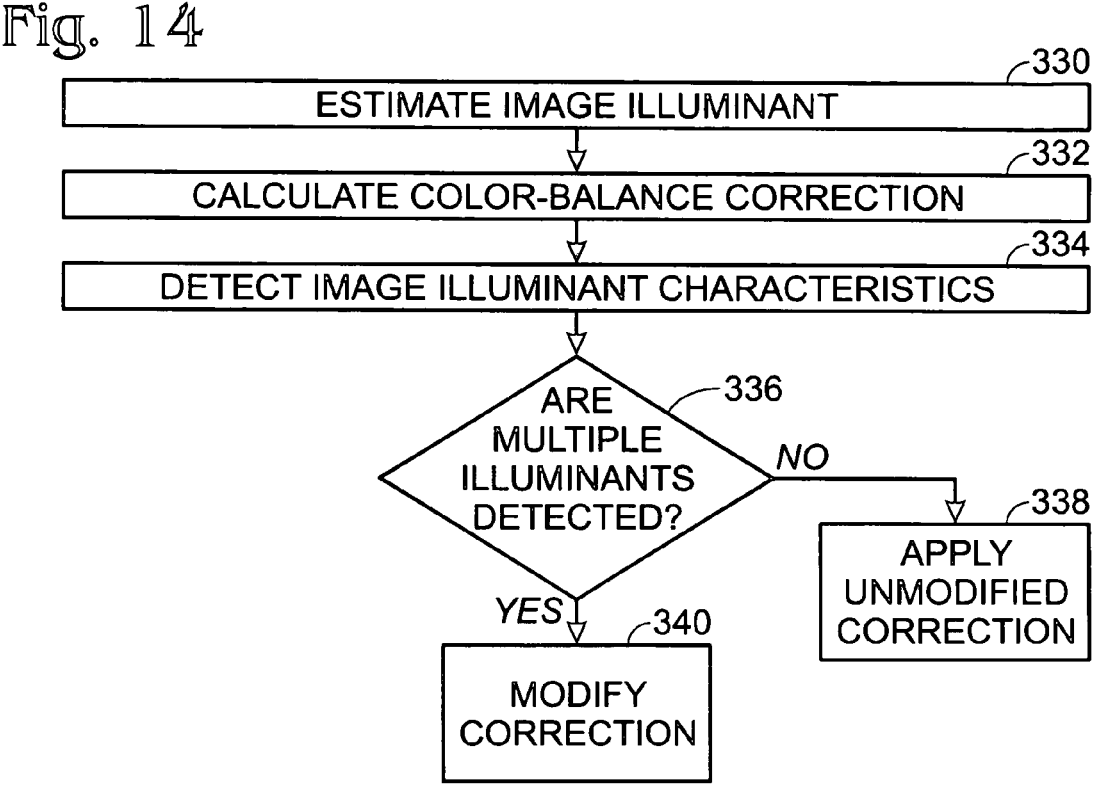
FIG. 14 is a flowchart illustrating embodiments wherein image exception characteristics comprising multiple illuminant characteristics are used to modify correction parameters.

In some embodiments of the present invention, illustrated in FIGS. 11 and 14, calculating digital image correction parameters 300 comprises estimating an image illuminant 330 and calculating a color-balance correction 332. Determining image exception characteristics 302 may also comprise detecting image illuminant characteristics 334 and modifying corrections in response to exception characteristics 304 may comprise detection of multiple illuminants 336. When multiple illuminants are detected 336 a correction may be modified 340. When only a single illuminant is detected 336, the correction may be applied to the image without modification 338.

In some of these embodiments, modifying the color-balance correction 340 may comprise attenuation of the color-balance correction in an entire image or in regions in which additional illuminants are detected, omission of the correction in an entire image or in regions where additional illuminants are detected, application of different corrections in regions illuminated by different illuminants and other correction modification techniques.

In some embodiments, the attenuation of a correction may be varied in response to pixel position, this step may comprise applying the full or partially attenuated correction to pixel positions in non-luminous regions and fully attenuating the correction in luminous regions. In other embodiments, varying the attenuation of a correction in response to pixel position comprises linearly attenuating the correction as the pixel position changes from a non-luminous region to a luminous region. Alternately, the correction is non-linearly attenuated as the pixel position changes from a non-luminous region to a luminous region.

In some embodiments, a correction may be differentially applied to various regions or areas of an image. This differential application may comprise vetoing or omitting a correction globally for the entire image. Differential application may also comprise a region-based correction. In some embodiments, the correction may be strongly attenuated in self-luminous regions, small gamut regions, unlikely gamut regions, multiple illuminant regions or other regions, while a full or partially attenuated correction is applied in other regions of the same image. Differential application may also comprise a spatially-varying correction responsive to a map, where a different illuminant is corrected in each region of the map.

In some embodiments, detecting image self-luminous regions 314 may comprise detecting self-luminous regions in response to a combination of confidence measures such as pixel color values and position parameters. For example, self-luminous regions may be detected in response to a function of chromaticity or color characteristics.

Figure 15:
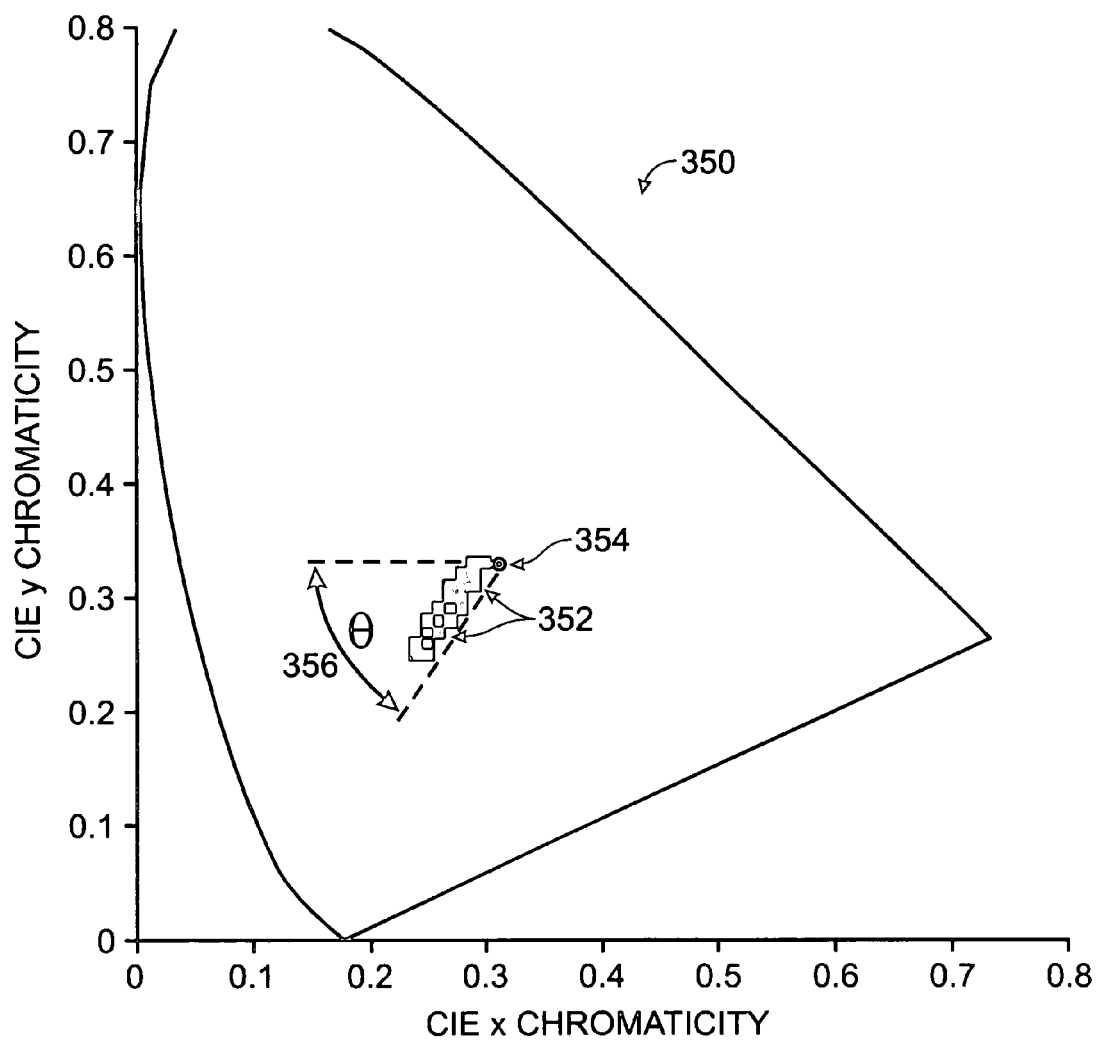
FIG. 15 is a chromaticity diagram

Some embodiments of the present invention may be described in relation to FIG. 15, which is a diagram 350 of CIE x-y chromaticity space. Points within the diagram 350 represent specific chromaticity values. The chromaticity of various illuminants may be represented by points 352 on the diagram. Specific points may represent reference points or values, such as reference point 354, which represents Daylight 6500 (D65). The diagram 350 may be implemented as a 2D lookup table from pixel chromaticity to weight. One method of creating this lookup table uses the chromaticity distribution of self-luminous objects across a large set of images. Using mainly sky images for example, the chromaticity distribution can be approximated parametrically with an angular function 356 relative to a chromaticity reference point, such as reference point D65 (354). In these embodiments, the bluish chroma of the daytime sky within an area that can be represented by an angular range radiating from reference point D65 (354). In some embodiments, a chromaticity range may be represented by a distance from a reference point on the chromaticity diagram 350 or by a combination of angle and distance, such as with a polar coordinate based on a reference point, such as D65 (354).

Once the chromaticity or other color characteristics of known self-luminous objects are known, pixel characteristics can be analyzed to determine similarities with known self-luminous objects.

In other embodiments, these methods can be based upon the frequencies of the raw self-luminous pixels. In other embodiments, an illuminant chromaticity may be modeled as a function of sun/camera relative angle and atmospheric condition. As the angle becomes closer to the sun, the illumination spectral power would shift from bluish-to-yellowish/whitish.

In further embodiments of the present invention, self-luminous regions may be detected in response to the position of a pixel with respect to image edges. One of the most common self-luminous objects is the sky. In many digital photographs and other images, the sky is located at the top of the image adjacent to the top edge. When orientation is unknown, the sky may be adjacent to any edge. Accordingly, self-luminous objects, such as the sky, are typically located adjacent to image edges. This position-based likelihood can be used to improve self-luminous object detection.

In still other embodiments, self-luminous regions may be detected in response to a confidence measure function such as pixel luminance. For example, self-luminous regions may be detected in response to a relatively high pixel luminance value, where high pixel luminance is defined as relatively high with respect to other image pixels, or higher than a threshold luminance.

Similarly to the chromaticity-based term discussed above, some embodiments may use several ways of defining a luminance-based term. The empirical approach is to look at the luminance distribution for known self-luminous regions from a large set of images. Approximations to any empirical data like this may also be valid. This term can be implemented using an equation or using a 1D look-up table (LUT). Some embodiments of the present invention concatenate a 2D chromaticity mapping and a 1D luminance mapping. Other embodiments may use a full 3D mapping when this complexity is appropriate. A full 3D function mapping from pixel color to probability of being self-luminous may be employed in some embodiments.

In some embodiments, detecting self-luminous regions in response to a combination of confidence measures comprising pixel color values, pixel position parameters and pixel luminance characteristics may comprise differentially weighting a pixel self-luminance confidence measure based on these characteristics.

What is claimed is:

1. A method for color correction of a digital image, the method comprising:
    determining digital image color correction parameters for a digital image;
    determining image exception characteristics; and,
    applying the correction parameters to the digital image in response to the image exception characteristics wherein said applying the correction parameters comprises varying the attenuation of a correction in response to pixel position wherein the attenuation is changed as the pixel position changes from a non-self-luminous region to a self-luminous region or from a self-luminous region to a non-self luminous region.

2. A method as described in claim 1 wherein determining image exception characteristics comprises determining an image self-luminous region.

3. A method as described in claim 2 wherein detecting an image self-luminous region comprises determining the luminance of at least one element, determining the chromaticity of a region and determining the spatial position of a region.

4. A method as described in claim 2 wherein detecting an image self-luminous region comprises determining the chromaticity of at least one element.

5. A method as described in claim 2 wherein detecting an image self-luminous region comprises determining the spatial position of at least one element.

6. The method of claim 2 wherein detecting a self-luminous region comprises detecting a position of at least one element relative to the top image spatial boundary.

7. The method of claim 2 wherein detecting a self-luminous region comprises detecting the position of at least one element relative to image boundaries.

8. A method as described in claim 2 wherein;
    calculating digital image correction parameters includes calculating a first correction and a second correction; and
    using a plurality of corrections includes applying the first correction to self-luminous regions and applying the second correction to non-self luminous regions.

9. A method as described in claim 1 wherein determining image exception characteristics comprises determining a color distribution property.

10. A method as described in claim 1 wherein determining image exception characteristics comprises determining an unlikely gamut.

11. A method as described in claim 1 wherein determining image exception characteristics comprises determining a small gamut.

12. A method as described in claim 1 wherein determining image exception characteristics comprises determining the presence of multiple illuminants.

13. A method as described in claim 1 wherein determining image exception characteristics comprises determining the identity of at least one illuminant.

14. A method as described in claim 1 wherein said applying the correction parameters comprises omitting said correction in one of a non-self-luminous region and a self luminous region.

15. A method as described in claim 1 wherein applying the correction parameters to the digital image in response to the image exception characteristics comprises using a plurality of corrections.

16. A method as described in claim 1 wherein said applying the correction parameters to the digital image in response to the image exception characteristics comprises differential application of a correction.

17. A method as described in claim 1 wherein applying the correction parameters to the digital image in response to the image exception characteristics comprises selection and application of alternate correction methods.

18. A method as described in claim 1 wherein applying the correction parameters to the digital image in response to the image exception characteristics comprises chromaticity variance of a correction.

19. A method as described in claim 1 wherein said applying the correction parameters comprises varying the attenuation of a correction in response to pixel position wherein the attenuation is changed linearly as the pixel position changes from a non-self-luminous region to a self luminous region.

20. A method as described in claim 1 wherein said applying the correction parameters comprises varying the attenuation of a correction in response to pixel position wherein the attenuation is changed non-linearly as the pixel position changes from a non-self-luminous region to a self luminous region.

21. A method as described in claim 1 wherein;
determining image exception characteristics comprises detecting a small color gamut distribution across the set of pixels; and,
modifying the correction parameters comprises attenuating the correction in response to detecting a small color gamut distribution.

22. The method as described in claim 1 wherein
determining image exception characteristics comprises detecting a plurality of illuminants illuminating a common image region;
calculating digital image correction parameters includes calculating a plurality of corrections corresponding to the plurality of illuminants; and,
the plurality of corrections are used to create a single modified correction, which is applied to the common image region.

23. A system for color correction of a digital image, the system comprising:
a parameter identifier for determining digital image color correction parameters for a digital image;
a characteristic identifier for determining image exception characteristics; and,
a correction processor for applying the correction parameters to the digital image in response to the image exception characteristics wherein said applying the correction parameters comprises varying the attenuation of a correction in response to pixel position wherein the attenuation is changed as the pixel position changes from a non-self-luminous region to a self-luminous region or from a self-luminous region to a non-self-luminous region.

* * * * *